US010823328B2

(12) United States Patent
Ikeda (10) Patent No.: US 10,823,328 B2
(45) Date of Patent: Nov. 3, 2020

(54) PRESS BRAKE IN WHICH HEIGHT POSITION OF OPERATION PANEL IS ADJUSTABLE IN SITTING STATE

(71) Applicant: AMADA HOLDINGS CO., LTD., Kanagawa (JP)

(72) Inventor: Satoru Ikeda, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 0 days.

(21) Appl. No.: 16/609,576

(22) PCT Filed: May 18, 2018

(86) PCT No.: PCT/JP2018/019233
§ 371 (c)(1),
(2) Date: Oct. 30, 2019

(87) PCT Pub. No.: WO2018/216606
PCT Pub. Date: Nov. 29, 2018

(65) Prior Publication Data
US 2020/0141536 A1 May 7, 2020

(30) Foreign Application Priority Data
May 24, 2017 (JP) .................................. 2017-102500

(51) Int. Cl.
*B21D 43/10* (2006.01)
*F16M 13/02* (2006.01)
(Continued)

(52) U.S. Cl.
CPC ........... *F16M 13/022* (2013.01); *B21D 5/002* (2013.01); *B21D 5/02* (2013.01);
(Continued)

(58) Field of Classification Search
CPC ............ F16M 13/02; F16M 2200/044; F16M 2200/063; F16M 2200/068; B21D 5/002; B21D 5/02; B21D 5/0281
(Continued)

(56) References Cited

U.S. PATENT DOCUMENTS 4,989,444 A * 2/1991 Murakami ........... B21D 5/0281
414/735
5,076,091 A * 12/1991 Sartorio ............... B21D 43/105
72/422

(Continued)

FOREIGN PATENT DOCUMENTS

JP 61-120447 U 7/1986
JP 61-141029 U 9/1986
(Continued)

OTHER PUBLICATIONS

International Search Report issued in PCT/JP2018/019233, dated Jul. 24, 2018.
(Continued)

*Primary Examiner* — Todd M Epps
(74) *Attorney, Agent, or Firm* — Greenblum & Bernstein, P.L.C.

(57) ABSTRACT

A press brake includes paired fixation links, upper link arm, lower link arm and paired raised-lowered links, which form a parallel link mechanism configured to allow an operation panel to be raised and lowered. The press brake includes a spring configured to generate torque depending on a height position of the operation panel in an opposite direction to torque generated by weight of the operation panel; and a torque hinge configured to maintain a posture of the parallel link mechanism by absorbing a torque difference between the torque generated by the weight of the operation panel and the torque generated by the spring.

6 Claims, 6 Drawing Sheets

(51) Int. Cl.
*B21D 5/00* (2006.01)
*B21D 5/02* (2006.01)

(52) U.S. Cl.
CPC . *F16M 2200/044* (2013.01); *F16M 2200/063* (2013.01); *F16M 2200/068* (2013.01)

(58) Field of Classification Search
USPC ..... 248/284.1, 274.1, 276.1, 281.11, 292.11, 248/292.13, 584, 585; 72/420, 422, 307
See application file for complete search history.

(56) References Cited

U.S. PATENT DOCUMENTS

| | | | | |
|---|---|---|---|---|
| 5,176,022 | A * | 1/1993 | Sartorio | B23Q 7/04 |
| | | | | 72/420 |
| 5,555,763 | A * | 9/1996 | Takeshita | B21D 5/0281 |
| | | | | 72/17.3 |
| 6,478,274 | B1 * | 11/2002 | Oddsen, Jr. | F16M 11/2014 |
| 6,722,178 | B1 * | 4/2004 | Ito | B21D 5/0281 |
| | | | | 414/736 |
| 7,210,328 | B2 * | 5/2007 | Strasser | B21D 5/02 |
| | | | | 72/20.1 |
| 7,373,797 | B2 * | 5/2008 | Rosenberger | B21D 7/12 |
| | | | | 72/307 |
| 8,074,484 | B2 * | 12/2011 | Denkmeier | B21D 5/0281 |
| | | | | 72/420 |
| 8,381,566 | B2 * | 2/2013 | Givens | B66C 1/48 |
| | | | | 72/420 |
| 9,327,748 | B2 * | 5/2016 | Wu | A61G 12/001 |
| 9,423,066 | B2 * | 8/2016 | Wang | F16M 11/2014 |
| 9,657,889 | B1 * | 5/2017 | Chumakov | F16M 11/2014 |

FOREIGN PATENT DOCUMENTS

| | | |
|---|---|---|
| JP | 63-20529 U | 2/1988 |
| JP | 2004-114063 A | 4/2004 |
| JP | 2008-262725 A | 10/2008 |
| JP | 2014-61899 A | 4/2014 |
| JP | 2014-83555 A | 5/2014 |

OTHER PUBLICATIONS

Decision to Grant a Patent issued in Japan Patent Appl. No. 2017-102500, dated Jul. 10, 2018, along with an English translation thereof.

* cited by examiner

PRESS BRAKE IN WHICH HEIGHT POSITION OF OPERATION PANEL IS ADJUSTABLE IN SITTING STATE

TECHNICAL FIELD

The present invention relates to a press brake used to bend a plate-shaped workpiece (metal plate) with an operator standing and sitting.

BACKGROUND ART

A press brake generally includes an operation panel operable by an operator. A configuration for attaching the operation panel to a main body frame of the press brake (conventional configuration of an operation panel attachment structure) is as follows (see Patent Literature 1).

A hollow support arm (horizontal arm in Patent Literature 1) extending in a horizontal direction is provided on an upper portion of the main body frame and a hollow guide arm (upper arm in Patent Literature 1) is provided on a distal end portion of the support arm to be suspended therefrom. Moreover, a hollow raised-lowered arm (lower arm in Patent Literature 1) extending in an up-down direction is provided inside the guide arm to be raisable and lowerable (movable in the up-down direction) and a distal end portion (lower end portion) of the raised-lowered arm protrudes downward from the guide arm. The raised-lowered arm has a mounting portion at a lower end and the operation panel is mounted to the mounting portion. Moreover, a spring configured to generate upward force (biasing force) depending on the weight of the operation panel is provided between an inner peripheral surface of the guide arm and an outer peripheral surface of the raised-lowered arm. Furthermore, the guide arm is provided with a lock mechanism (handle and the like in Patent Literature 1) configured to lock (fix) the operation panel (raised-lowered arm and operation panel) such that the operation panel is unable to be raised and lowered relative to the guide arm and the operator can perform lock and unlock operations on the lock mechanism. Moreover, an electric cable connected to the operation panel passes through an interior space of the support arm, an interior space of the guide arm, and an interior space of the raised-lowered arm.

In the aforementioned configuration, the operator performs the unlock operation on the lock mechanism to cancel the locked state (fixed state) of the operation panel and raises or lowers the operation panel integrally with the raised-lowered arm to dispose the operation panel at the desired height position. Then, the operator performs the lock operation on the lock mechanism to lock the operation panel such that the operation panel is unable to be raised and lowered relative to the guide arm. The height position of the operation panel can be thereby arbitrarily adjusted within a range of a raising-lowering stroke (raising-lowering range) of the operation panel.

CITATION LIST

Patent Literature

Patent Literature 1: Japanese Examined Utility Model Registration Application Publication No. Sho 63-20529

Although the press brake described in Patent Literature 1 is not assumed to be used for the bending performed with the operator sitting, in recent years, the bending is performed with the operator not only in a standing state but also in a sitting state.

Assume a case where the operator uses the press brake described in Patent Literature 1 to perform bending while sitting. When the operator decides to adjust the height position of the operation panel in the middle of bending, the operator needs to stand up from a seat and perform the unlock and lock operations of the lock mechanism. Accordingly, this press brake has a problem that interruption time in the bending due to the adjustment of the height position of the operation panel is long and it is difficult to sufficiently improve the productivity of the bending performed with the operator sitting.

Moreover, in a design in which the bending is to be performed with the operator standing and sitting, the adjustment range of the height position of the operation panel, that is the raising-lowering stroke of the operation panel needs to be sufficiently increased from that in a design in which the bending is performed with the operator standing. As a result, the distance between a distal end portion of the support arm and the mounting portion of the raised-lowered arm changes (varies) greatly in the adjustment of the height position of the operation panel. Thus, such a design has a problem that large local bending deformation occurs in the electric cable connected to the operation panel and this may lead to damage in the electric cable.

SUMMARY OF INVENTION

Thus, an object of the present invention is to provide a press brake with a new configuration which can solve the aforementioned problems. More specifically, an object of the present invention is to provide a press brake which can reduce interruption time in bending due to adjustment of the height position of an operation panel and thereby sufficiently improve productivity of bending performed with an operator sitting.

According to one aspect of the present invention, there is provided a press brake used to bend a plate-shaped workpiece with an operator standing and sitting and including an operation panel operable by the operator, the press brake comprising: an attachment base provided on a main body frame and having paired fixation links on opposite sides from each other in a horizontal direction; an upper link arm having a base end portion disposed between and turnably connected to an upper portion of one of the fixation links (first fixation link) and an upper portion of the other fixation link (second fixation link) and configured to swing in an up-down direction; a lower link arm having a base end portion disposed between and turnably connected to a lower portion of the one fixation link (first fixation link) and a lower portion of the other fixation link (second fixation link) and configured to swing in the up-down direction; a raised-lowered body having a mounting portion to which the operation panel is mounted and paired raised-lowered links which are on opposite sides from each other in the horizontal direction and which are disposed between and turnably connected to a distal end portion of the upper link arm and a distal end portion of the lower link arm, the raised-lowered body configured to be raised and lowered (movable in the up-down direction), wherein the paired fixation links, the upper link arm, the lower link arm and the paired raised-lowered links form a parallel link mechanism configured to allow the operation panel to be raised and lowered; a spring configured to generate torque depending on a height position of the operation panel in an opposite direction to torque generated by weight of the operation panel; and a torque hinge configured to maintain a posture of the parallel link mechanism by absorbing a torque difference between the torque generated by the weight of the operation panel and the torque generated by the spring.

It is preferable that the attachment base and the raised-lowered body are formed to be hollow, a space between the upper link arm and the lower link arm communicates with an interior space of the attachment base and an interior space of the raised-lowered body, and an electric cable connected to the operation panel passes through the interior space of the raised-lowered body, the space between the upper link arm and the lower link arm, and the interior space of the attachment base.

It is preferable that the upper link arm has an upper plate portion and upper flange portions formed respectively on both sides of the upper plate portion to protrude downward, the lower link arm has a lower plate portion facing the upper plate portion in the up-down direction and lower flange portions formed respectively on both sides of the lower plate portion to protrude downward and overlapping the respective upper flange portions.

It is preferable that the torque hinge is provided in one of a portion between the attachment base and the base end portion of the upper link arm, a portion between the attachment base and the base end portion of the lower link arm, a portion between the raised-lowered body and a distal end portion of the upper link arm, and a portion between the raised-lowered body and a distal end portion of the lower link arm.

It is preferable that the spring is provided inside the parallel link mechanism.

It is preferable that the press brake further comprises a support arm having a base end portion connected to an upper portion of the main body frame and the attachment base is provided on the main body frame with the support arm therebetween.

According to one aspect of the present invention, swinging the upper link arm and the lower link arm in the up-direction raises and lowers the operation panel integrally with the raised-lowered body with the fixation links and the raised-lowered links maintained parallel to one another and the operation panel is thereby disposed at the height position desired by the operator. Then, the spring generates the torque depending on the height position of the operation panel in the opposite direction to the torque generated by the weight of the operation panel. The torque hinge maintains the posture of the parallel link mechanism by absorbing the torque difference between the torque generated by the weight of the operation panel and the torque generated by the spring. The height position of the operation panel can be thereby arbitrarily adjusted within the range of the raising-lowering stroke of the operation panel without using the lock mechanism which fixes the operation panel such that the operation panel is unable to be raised and lowered relative to the attachment base. In other words, the operator can adjust the height position of the operation panel while sitting on a seat in the middle of the bending performed while sitting.

As described above, the paired fixation links, the upper link arm, the lower link arm, and the paired raised-lowered links form the parallel link mechanism configured to allow the operation panel to be raised and lowered. Accordingly, when the raising-lowering stroke (raising-lowering range) of the operation panel is made sufficiently large by increasing the lengths of the upper link arm and the lower link arm, the change amount (variation amount) in the distance between the attachment base and the mounting portion of the raised-lowered body in the adjustment of the height position of the operation panel can be made small.

According to the present invention, as described above, the operator can adjust the height position of the operation panel while sitting on the seat in the middle of the bending performed while sitting. Accordingly, the present invention can reduce the interruption time in the bending due to the adjustment of the height position of the operation panel and sufficiently improve the productivity of the bending performed with the operator sitting.

Moreover, according to the present invention, when the raising-lowering stroke of the operation panel is made sufficiently large, the change amount in the distance between the attachment base and the mounting portion of the raised-lowered body in the adjustment of the height position of the operation panel can be made small. Accordingly, in the present invention, no large local bending deformation occurs in the electric cable connected to the operation panel when the bending is performed with the operator standing and sitting, and damage to the electric cable can be sufficiently prevented.

BRIEF DESCRIPTION OF DRAWINGS

FIG. 6 Parts (a) and (b) of FIG. 6 are views illustrating operations of the configuration for attaching the operation panel to the main body frame of the press brake.

DESCRIPTION OF EMBODIMENTS

An embodiment of the present invention is described with reference to FIG. 1 to parts (a) and (b) of FIG. 6.

Note that "provided" in the description and claims of the present application means not only directly provided but also indirectly provided with another member therebetween. "Provided between A and B" means not only provided between A and B but also provided to extend from A to B. "FF" in the drawings denotes a forward direction, "FR" a rearward direction, "L" a leftward direction, "R" a rightward direction, "U" an upward direction, and "D" a downward direction.

Figure 1:
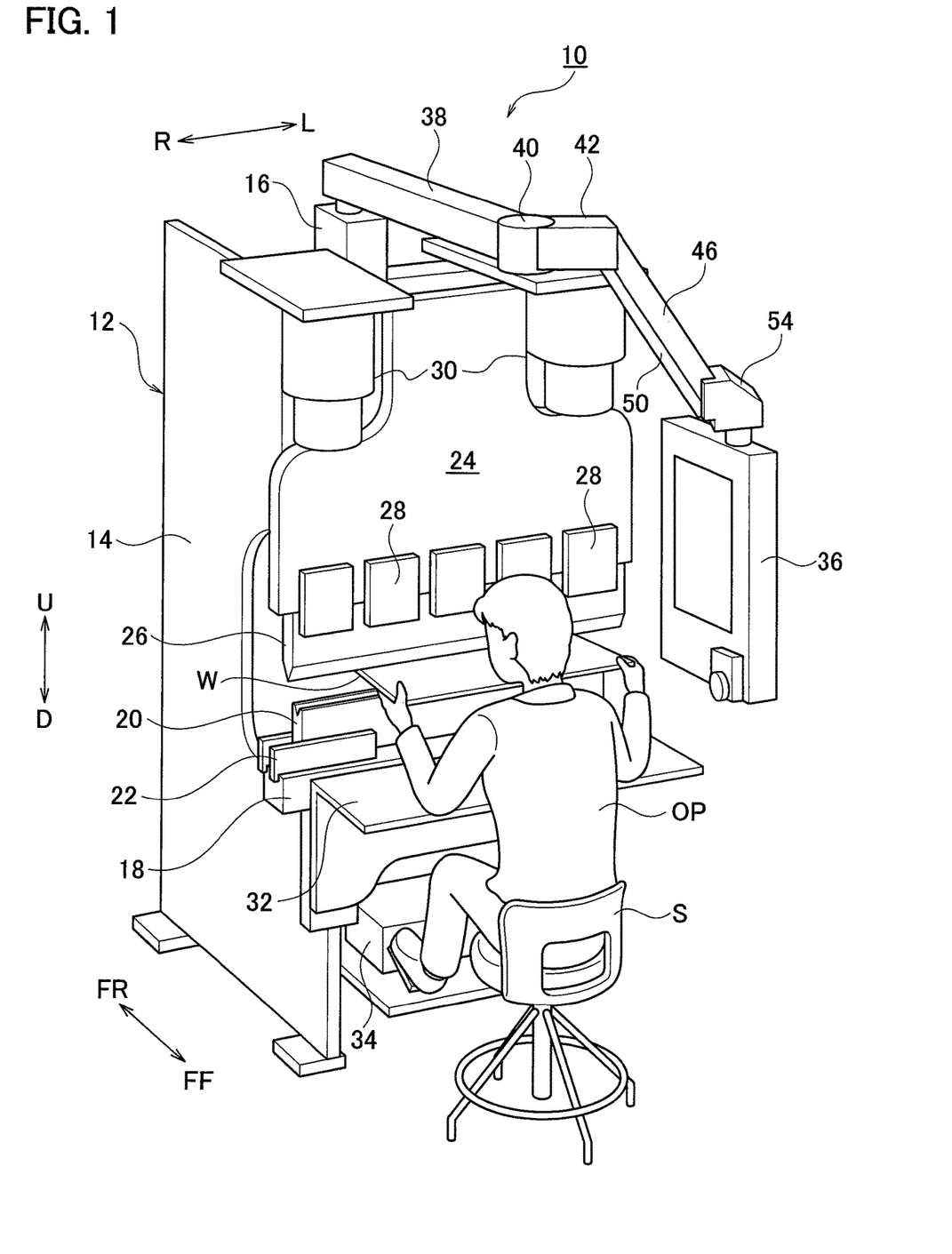
FIG. 1 is a perspective view of a press brake according to an embodiment of the present invention and illustrates a state where bending is performed with an operator sitting.
Figure 2:
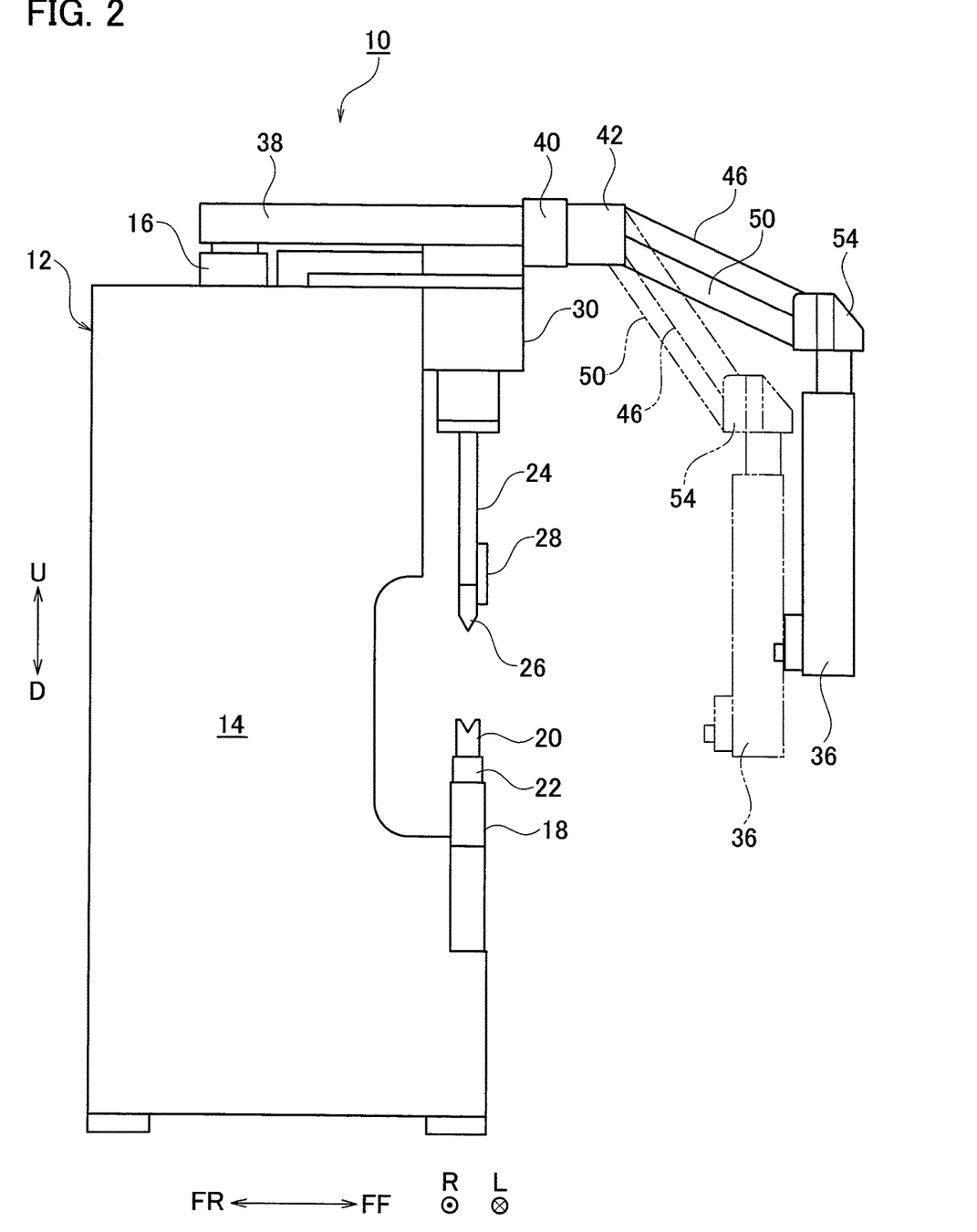
FIG. 2 is a side view of the press brake according to the embodiment of the present invention in which a workbench and a foot switch are omitted.

As illustrated in FIGS. 1 and 2, a press brake 10 according to the embodiment of the present invention is a processing machine used by an operator OP to bend a plate-shaped workpiece (metal plate) W with the operator OP standing and sitting. Moreover, the press brake 10 includes a main body frame 12 as a base. The main body frame 12 has paired side plates 14 (only one is illustrated) on opposite sides from each other in a left-right direction and a support column 16 provided between the paired side plates 14 and protruding above the side plates 14.

A lower table 18 extending in the left-right direction is provided in a front lower portion (lower portion on the front side) of the main body frame 12. A lower die (die) 20 is provided on the upper side of the lower table 18 with multiple lower die holders 22 therebetween to be attachable and detachable. Moreover, an upper table 24 extending in the left-right direction is provided in a front upper portion (upper portion on the front side) of the main body frame 12 to be raisable and lowerable (movable in an up-down direction). An upper die (punching die) 26 is provided on the lower side of the upper table 24 with multiple upper die holders 28 therebetween to be attachable and detachable. Furthermore, paired table raising-lowering devices 30 configured to raise and lower the upper table 24 are provided at an interval in the left-right direction in the upper portion of the main body frame 12. Each of the table raising-lowering devices 30 has an electric motor, a ball screw, and the like as described in, for example, Japanese Patent Application Publication No. 2004-114063 and the like.

Note that the lower table 18 may be configured to be raisable and lowerable instead of the upper table 24. The table raising-lowering devices 30 may each have a hydraulic cylinder instead of the electric motor, the ball screw, and the like.

A backgauge device (illustration omitted) for aligning the workpiece W in the front-rear direction relative to the lower die 20 is provided on the rear side (back side) of the lower table 18. Moreover, a workbench 32 for assisting work of the sitting operator OP is provided on the front side of the lower table 18 and is swingable (openable and closable) in an up-down direction. Moreover, a foot switch 34 for driving the paired table raising-lowering devices 30 is provided below the workbench 32. The operator OP can operate the foot switch 34 by pressing it with the foot.

In the aforementioned configuration, the workpiece W is aligned in the front-rear direction relative to the lower die 20 by using the backgauge device. Then, the operator OP drives the paired table raising-lowering devices 30 by performing operation of pressing the foot switch 34 with the foot. The upper table 24 is thus lowered (moved downward) and a distal end portion of the upper die 26 engages with a V groove of the lower die 20. Cooperation of the upper die 26 and the lower die 20 thereby enables bending of the workpiece W. Note that, after the bending, the paired table raising-lowering devices 30 are driven to raise (move upward) the upper table 24.

The press brake 10 includes an operation panel 36 which is operable by the operator OP. The operation panel 36 has therein a control device (illustration omitted) which controls the table raising-lowering devices 30, the backgauge device, and the like. Specific contents of a configuration for attaching the operation panel 36 to the main body frame 12 (configuration of an operation panel attachment structure) are as follows.

As illustrated in FIGS. 1 and 2, a base end portion of a hollow support arm 38 extending in the horizontal direction is connected to the support column 16 which is part of the main body frame 12 to be swingable about a vertical swing axis. Moreover, one end portion (base end portion) of a hollow joint member 40 is connected to a distal end portion of the support arm 38 to be swingable about a vertical swing axis. An interior space of the joint member 40 communicates with an interior space of the support arm 38.

Figure 3:
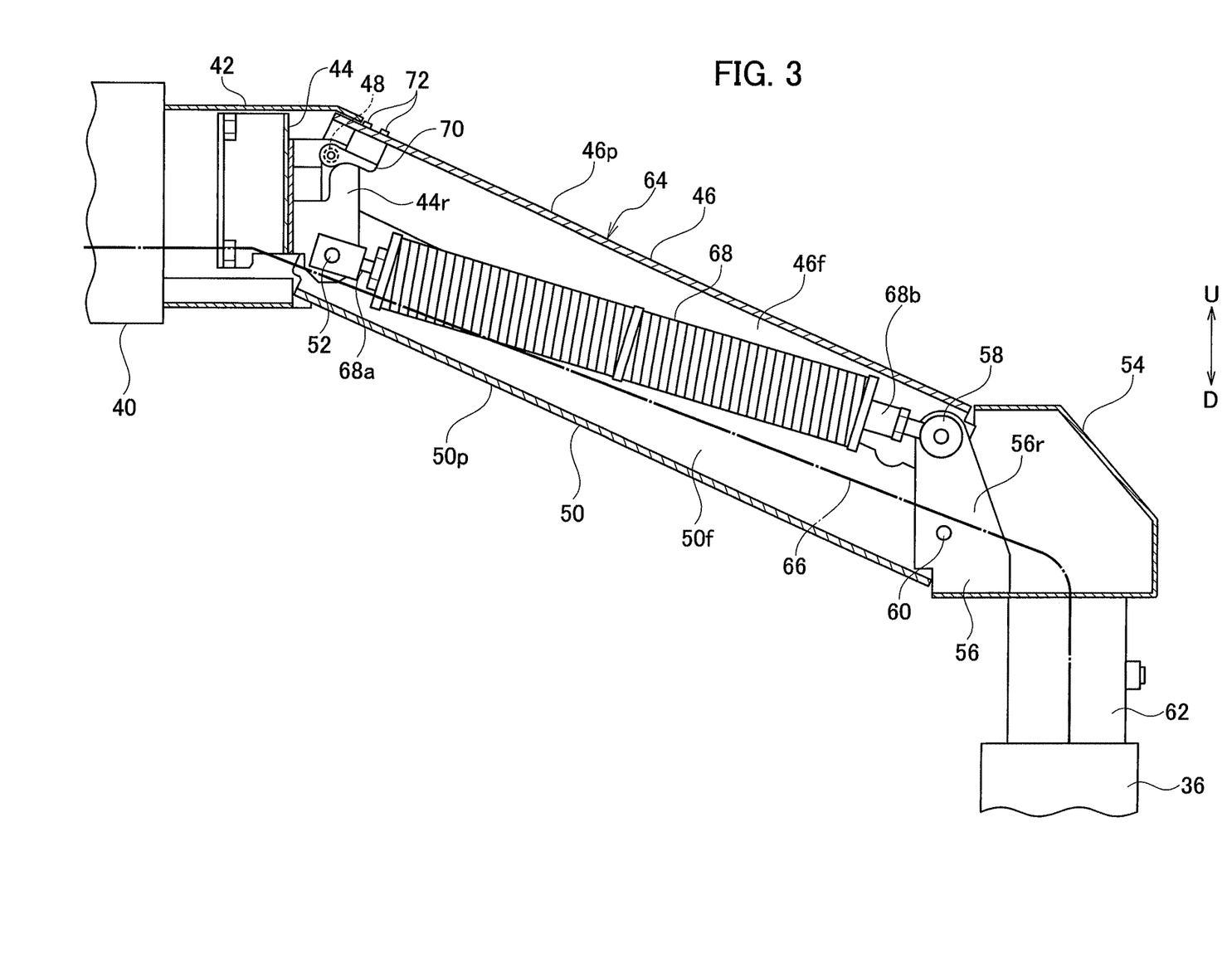
FIG. 3 is a cross-sectional view illustrating a configuration for attaching an operation panel to a main body frame of the press brake which is a main portion of the embodiment of the present invention and illustrates some parts of the configuration for attaching the operation panel to the main body frame of the press brake in an uncut manner.
Figure 4:
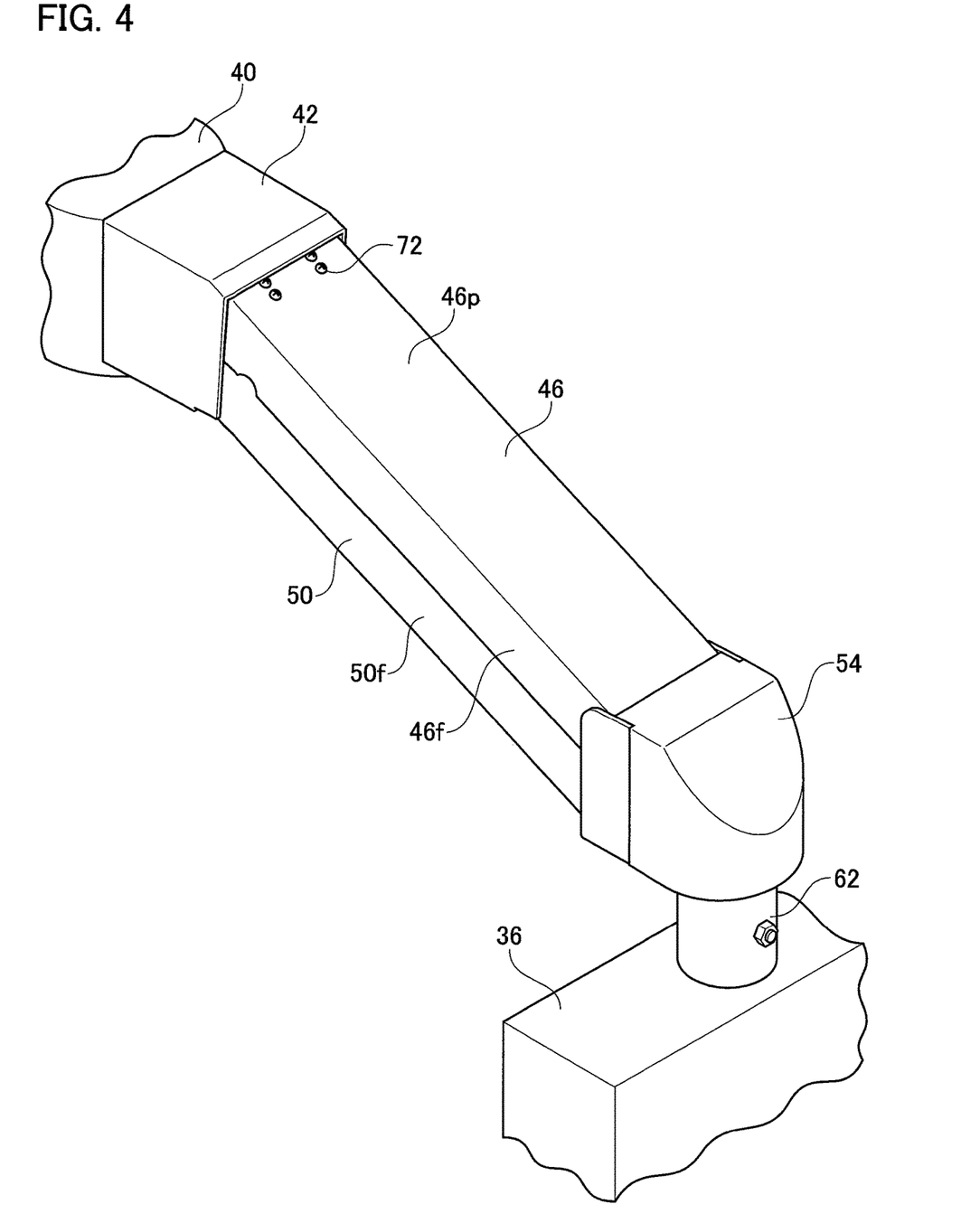
FIG. 4 is a perspective view illustrating the configuration for attaching the operation panel to the main body frame of the press brake.
Figure 5:
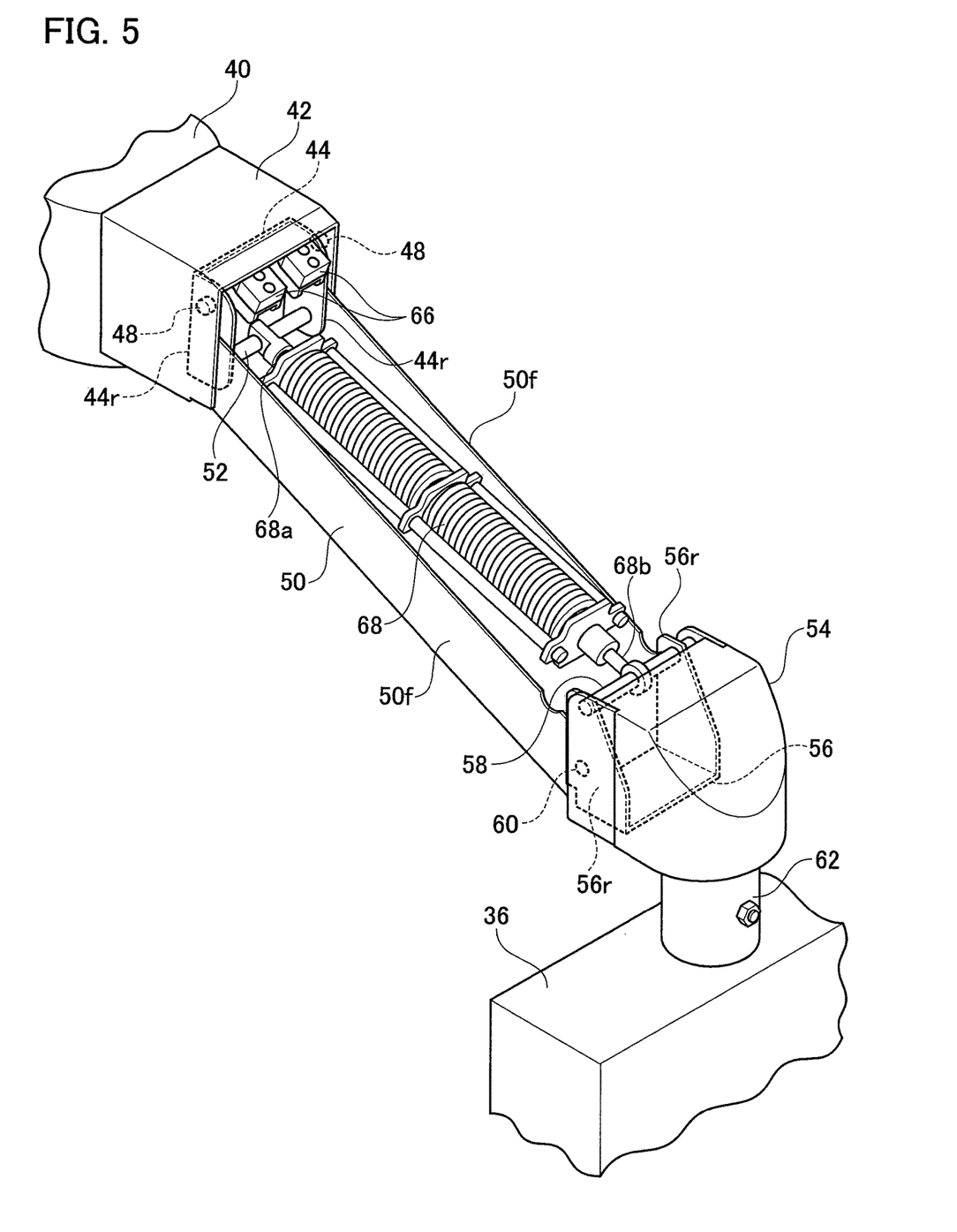
FIG. 5 is a perspective view illustrating an interior of the configuration for attaching the operation panel to the main body frame of the press brake.

As illustrated in FIGS. 3 to 5, a hollow attachment base 42 is provided on another end portion (distal end portion) of the joint member 40. In other words, the attachment base 42 is provided on the support column 16 with the support arm 38 and the joint member 40 therebetween. An interior space of the attachment base 42 communicates with the interior space of the joint member 40. The attachment base 42 includes therein a fixation bracket 44 having a U-shape in a plan view. The fixation bracket 44 has paired fixation links 44r, on opposite sides from each other in the horizontal direction, respectively on both sides. In other words, the attachment base 42 has therein the paired fixation links 44r. Note that two fixation brackets (illustration omitted) having L-shapes in the plan view may be used instead of the fixation bracket 44 having the U-shape in the plan view.

A base end portion of an upper link arm 46 configured to swing in the up-down direction is disposed between and turnably connected to an upper portion of one fixation link (first fixation link) 44r and an upper portion of the other fixation link (second fixation link) 44r via paired connection pins 48. Specifically, one side of the base end portion of the upper link arm 46 is turnably connected to the upper portion of the one fixation link 44r via the connection pin 48 and the other side of the base end portion of the upper link arm 46 is turnably connected to the upper portion of the other fixation link 44r via the connection pin 48. Moreover, the upper link arm 46 is formed to have a U-shaped cross-section and has an upper plate portion 46p and upper flange portions 46f formed respectively on both sides (both sides in the width direction) of the upper plate portion 46p to protrude downward.

A base end portion of a lower link arm 50 configured to swing in the up-down direction is disposed between and turnably connected to a lower portion of the one fixation link 44r and a lower portion of the other fixation link 44r via a connection shaft 52. Specifically, one side of the base end portion of the lower link arm 50 is turnably connected to the lower portion of the one fixation link 44r via the connection shaft 52 and the other side of the base end portion of the lower link arm 50 is turnably connected to the lower portion of the other fixation link 44r via the connection shaft 52. Moreover, the lower link arm 50 is formed to have a U-shaped cross section and has a lower plate portion 50p facing the upper plate portion 46p in the up-down direction and lower flange portions 50f formed respectively on both sides (both sides in the width direction) of the lower plate portion 50p to protrude upward. Each of the lower flange portions 50f overlaps the corresponding upper flange portion 46f while being out of contact therewith.

A hollow raised-lowered body 54 configured to be raised and lowered (moved in the up-down direction) is provided between a distal end portion of the upper link arm 46 and a distal end portion of the lower link arm 50. The raised-lowered body 54 has therein a raised-lowered bracket 56 having a U-shape in a side view (front view). Moreover, the raised-lowered bracket 56 has paired raised-lowered links 56r, on opposite sides from each other in the horizontal direction, respectively on both sides. The paired raised-lowered links 56r are disposed between and turnably connected to the distal end portion of the upper link arm 46 and the distal end portion of the lower link arm 50 via two connection shafts 58, 60. Specifically, in upper portions of the paired raised-lowered links 56r, the connection shaft 58 is turnably connected to the distal end portion of the upper link arm 46. Lower portions of the paired raised-lowered links 56r are turnably connected to the distal end portion of the lower link arm 50 via the connection shaft 60. Furthermore, the raised-lowered body 54 has a cylindrical mounting portion 62 in a lower portion (lower side) thereof and the operation panel 36 is mounted to the mounting portion 62 in a suspended manner. Note that two raised-lowered brackets (illustration omitted) having L-shapes in the side view can be used instead of the raised-lowered bracket 56 having the U-shape in the side view. The raised-lowered body 54 may has a mounting portion (illustration omitted) to which the operation panel 36 is mounted in a state supported from below, instead of the mounting portion 62.

The paired fixation links 44r, the upper link arm 46, the lower link arm 50, the paired raised-lowered links 56r form a parallel link mechanism 64 configured to allow the operation panel 36 to be raised and lowered. Moreover, the space between the upper link arm 46 and the lower link arm 50 communicates with the interior space of the attachment base 42 and an interior space of the raised-lowered body 54. Furthermore, an electric cable 66 connected to the operation panel 36 passes through the interior space of the raised-lowered body 54, the space between the upper link arm 46 and the lower link arm 50, and the interior spaces of the attachment base 42, the joint member 40, and the support arm 38.

Figure 6:
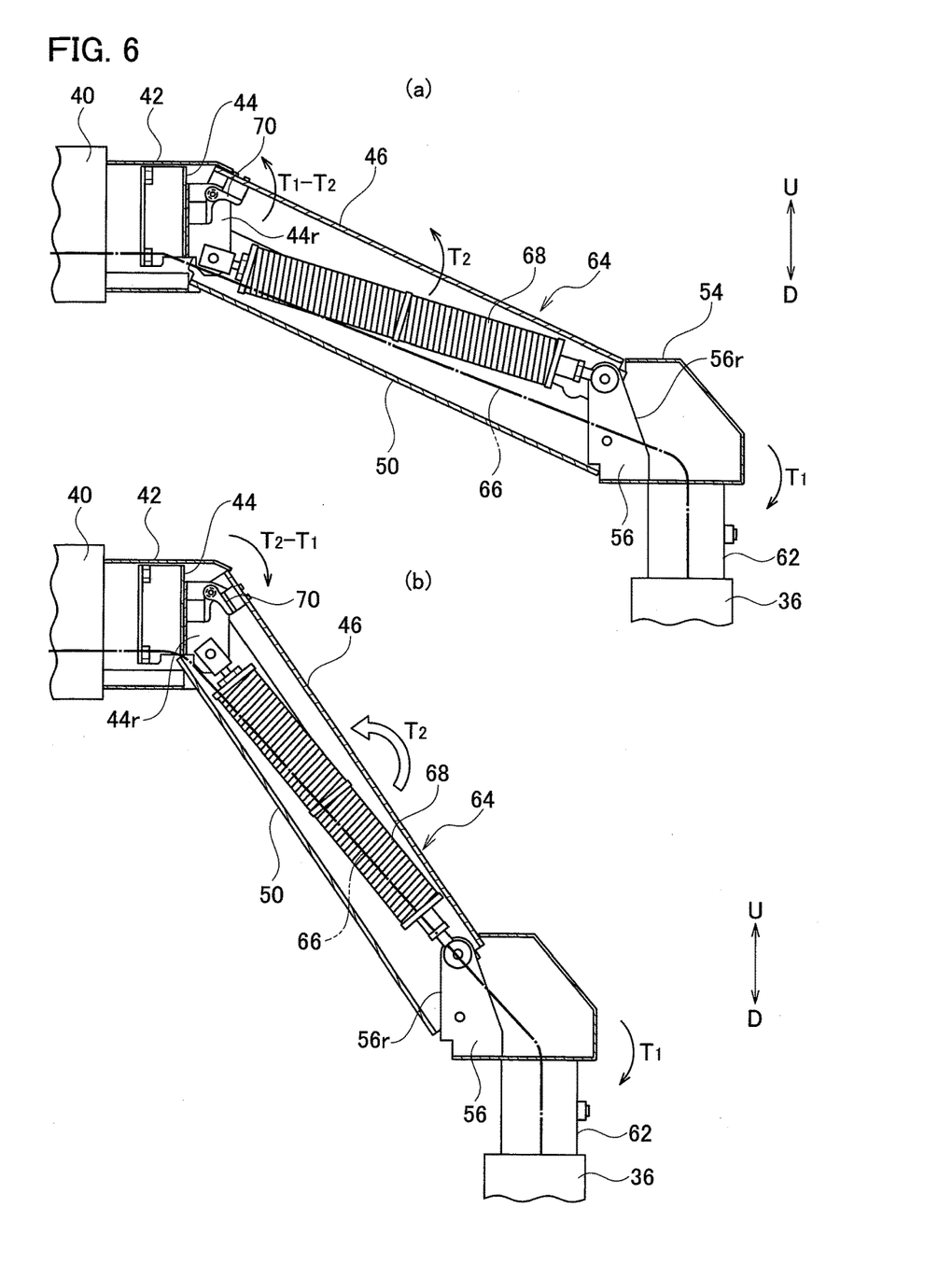

As illustrated in FIG. 3 to parts (a) and (b) of FIG. 6, a compression coil spring 68 which generates torque T2 depending on the height position of the operation panel 36 in the opposite direction to torque T1 generated by the weight of the operation panel 36 is provided between the connection shaft 52 and the connection shaft 58. The compression coil spring 68 has rod ends 68a, 68b respectively at its both ends. A distal end portion of the rod end 68a is turnably connected to an intermediate portion of the connection shaft 52 and a distal end portion of the rod end 68b is turnably connected to an intermediate portion of the connection shaft 58. Note that a portion where the compression coil spring 68 is arranged is not limited to a portion between the connection shaft 52 and the connection shaft 58 as long as the portion is inside the parallel link mechanism 64. A tension coil spring, a gas spring, a disc spring, or the like may be used instead of the compression coil spring 68.

Multiple torque hinges 70 are provided between the fixation bracket 44 and the base end portion of the upper link arm 46 with multiple set screws 72 therebetween. The multiple torque hinges 70 are configured to maintain the posture of the parallel link mechanism 64 by absorbing a torque difference T1-T2 (or T2-T1) between the torque T1 generated by the weight of the operation panel 36 and the torque T2 generated by the compression coil spring 68. In this case, part (a) of FIG. 6 illustrates a state where the compression coil spring 68 generates the torque T2 smaller than the torque T1 generated by the weight of the operation panel 36 in the opposite direction to the torque T1 due to raising of the operation panel 36. Part (b) of FIG. 6 illustrates a state where the compression coil spring 68 generates the torque T2 greater than the torque T1 generated by the weight of the operation panel 36 in the opposite direction to the torque T1 due to lowering of the operation panel 36. Note that the portion where the multiple torque hinges 70 are arranged is not limited to the portion between the fixation bracket 44 and the base end portion of the upper link arm 46 and may be any one of a portion between the fixation bracket 44 and the base end portion of the lower link arm 50, a portion between the raised-lowered body 54 and the distal end portion of the upper link arm 46, and a portion between the raised-lowered body 54 and the distal end portion of the lower link arm 50.

Next, operations and effects of the embodiment of the present invention are described.

Swinging the upper link arm 46 and the lower link arm 50 in the up-down direction raises and lowers the operation panel 36 integrally with the raised-lowered body 54 with the fixation links 44r and the raised-lowered links 56r maintained parallel to one another and the operation panel 36 is thereby disposed at a height position desired by the operator. Then, the compression coil spring 68 generates the torque T2 depending on the height position of the operation panel 36 in the opposite direction to the torque T1 generated by the weight of the operation panel 36. The torque hinges 70 maintain the posture of the parallel link mechanism by absorbing the torque difference T1-T2 (or T2-T1) between the torque T1 generated by the weight of the operation panel 36 and the torque T2 generated by the compression coil spring 68. The height position of the operation panel 36 can be thereby arbitrarily adjusted within a range of a raising-lowering stroke of the operation panel 36 without using a lock mechanism which fixes the operation panel 36 such that the operation panel 36 is unable to be raised or lowered relative to the attachment base 42. In other words, the operator OP can adjust the height position of the operation panel 36 while sitting on a seat in the middle of the bending performed while sitting.

Moreover, as described above, the paired fixation links 44r, the upper link arm 46, the lower link arm 50, and the paired raised-lowered links 56r form the parallel link mechanism 64 configured to allow the operation panel 36 to be raised and lowered. Accordingly, when the raising-lowering stroke (raising-lowering range) of the operation panel 36 is made sufficiently large by increasing the lengths of the upper link arm 46 and the lower link arm 50, a change amount (variation amount) in the distance between the attachment base 42 and the mounting portion 62 of the raised-lowered body 54 in the adjustment of the height position of the operation panel 36 can be made small.

Furthermore, as described above, the upper link arm 46 has the upper plate portion 46p and the upper flange portions 46f formed respectively on both sides of the upper plate portion 46p to protrude downward. The lower link arm 50 has the lower plate portion 50p facing the upper plate portion 46p in the up-down direction and the lower flange portions 50f formed respectively on both sides of the lower plate portion 50p to protrude upward and overlapping the respective upper flange portions 46f while being out of contact therewith. Accordingly, the upper link arm 46 and the lower link arm 50 have a function as external parts (protection covers).

Accordingly, in the embodiment of the present invention, as described above, the operator OP can adjust the height position of the operation panel 36 while sitting on a seat S in the middle of the bending performed while sitting. Accordingly, in the embodiment of the present invention, it is possible to reduce interruption time in the bending due to the adjustment of the height position of the operation panel 36 and sufficiently improve the productivity of the bending performed with the operator sitting.

Moreover, in the embodiment of the present invention, as described above, when the raising-lowering stroke of the operation panel 36 is made sufficiently large, the change amount in the distance between the attachment base 42 and the mounting portion 62 of the raised-lowered body 54 in the adjustment of the height position of the operation panel 36 can be made small. Accordingly, in the embodiment of the present invention, no large local bending deformation occurs in the electric cable 66 connected to the operation panel 36 when the bending is performed with the operator standing and sitting and the damage to the electric cable 66 can be sufficiently prevented.

Furthermore, in the embodiment of the present invention, as described above, the upper link arm 46 and the lower link arm 50 have the function as the external parts. Accordingly, in the embodiment of the present invention, it is possible to omit the protection cover from the configuration for attaching the operation panel 36 to the main body frame 12 (configuration of the operation panel attachment structure) and simplify the configuration (configuration of the operation panel attachment structure).

Note that the present invention is not limited to the description of the aforementioned embodiment and can be carried out in other various modes by making various changes. The scope of rights included in the present invention is not limited by the aforementioned embodiment.

The invention claimed is:

1. A press brake used to bend a plate-shaped workpiece with an operator standing and sitting and including an operation panel operable by the operator, comprising:
   an attachment base provided on a main body frame and having paired fixation links on opposite sides from each other in a horizontal direction;
   an upper link arm having a base end portion disposed between and turnably connected to an upper portion of one of the fixation links and an upper portion of the other fixation link and configured to swing in an up-down direction;
   a lower link arm having a base end portion disposed between and turnably connected to a lower portion of the one fixation link and a lower portion of the other fixation link and configured to swing in the up-down direction;
   a raised-lowered body having a mounting portion to which the operation panel is mounted and paired raised-lowered links which are on opposite sides from each other in the horizontal direction and which are disposed between and turnably connected to a distal end portion of the upper link arm and a distal end portion of the lower link arm, the raised-lowered body configured to be raised and lowered, wherein the paired fixation links, the upper link arm, the lower link arm and the paired raised-lowered links form a parallel link mechanism configured to allow the operation panel to be raised and lowered;
   a spring configured to generate torque depending on a height position of the operation panel in an opposite direction to torque generated by weight of the operation panel; and
   a torque hinge configured to maintain a posture of the parallel link mechanism by absorbing a torque difference between the torque generated by the weight of the operation panel and the torque generated by the spring.

2. The press brake according to claim 1, wherein
   the attachment base and the raised-lowered body are formed to be hollow,
   a space between the upper link arm and the lower link arm communicates with an interior space of the attachment base and an interior space of the raised-lowered body, and
   an electric cable connected to the operation panel passes through the interior space of the raised-lowered body, the space between the upper link arm and the lower link arm, and the interior space of the attachment base.

3. The press brake according to claim 1, wherein
   the upper link arm has an upper plate portion and upper flange portions formed respectively on both sides of the upper plate portion to protrude downward,
   the lower link arm has a lower plate portion facing the upper plate portion in the up-down direction and lower flange portions formed respectively on both sides of the lower plate portion to protrude upward downward and overlapping the respective upper flange portions.

4. The press brake according to claim 1, wherein the torque hinge is provided in one of a portion between the attachment base and the base end portion of the upper link arm, a portion between the attachment base and the base end portion of the lower link arm, a portion between the raised-lowered body and a distal end portion of the upper link arm, and a portion between the raised-lowered body and a distal end portion of the lower link arm.

5. The press brake according to claim 1, wherein the spring is provided inside the parallel link mechanism.

6. The press brake according to claim 1, further comprising a support arm having a base end portion connected to an upper portion of the main body frame, wherein
   the attachment base is provided on the main body frame with the support arm therebetween.

* * * * *